United States Patent
Kim et al.

(10) Patent No.: US 9,268,453 B2
(45) Date of Patent: Feb. 23, 2016

(54) TOUCH SENSOR INTEGRATED TYPE DISPLAY DEVICE

(71) Applicant: LG Display Co., Ltd., Seoul (KR)

(72) Inventors: Seungkyeom Kim, Gyeonggi-do (KR); Jinseong Kim, Jeollabuk-do (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 68 days.

(21) Appl. No.: 14/097,469

(22) Filed: Dec. 5, 2013

(65) Prior Publication Data

US 2014/0168150 A1 Jun. 19, 2014

(30) Foreign Application Priority Data

Dec. 17, 2012 (KR) .................... 10-2012-0147752

(51) Int. Cl.
| | |
|---|---|
| *G06F 3/045* | (2006.01) |
| *G06F 3/041* | (2006.01) |
| *G02F 1/1362* | (2006.01) |
| *G06F 3/044* | (2006.01) |
| *G02F 1/1343* | (2006.01) |

(52) U.S. Cl.
CPC .......... *G06F 3/045* (2013.01); *G02F 1/136204* (2013.01); *G06F 3/044* (2013.01); *G06F 3/0412* (2013.01); *G02F 2001/134318* (2013.01); *G06F 2203/04103* (2013.01)

(58) Field of Classification Search
CPC ....... G06F 3/044; G06F 3/045; G06F 3/0412; G06F 2203/04103; G02F 1/136204; G02F 1/13338
USPC .................................................. 345/173–174
See application file for complete search history.

(56) References Cited

U.S. PATENT DOCUMENTS

| | | | | |
|---|---|---|---|---|
| 2010/0194707 A1* | 8/2010 | Hotelling et al. | ............. | 345/173 |
| 2011/0304564 A1* | 12/2011 | Kim | ....................... | G06F 3/044 345/173 |
| 2012/0274602 A1* | 11/2012 | Bita | ..................... | G02B 26/001 345/174 |

* cited by examiner

*Primary Examiner* — Temesgh Ghebretinsae
*Assistant Examiner* — Kwin Xie
(74) *Attorney, Agent, or Firm* — Morgan, Lewis & Bockius LLP

(57) ABSTRACT

A touch sensor integrated type display device includes gate and data lines that cross over each other to form a plurality of pixel regions; first electrodes arranged in parallel in a first direction; second electrodes arranged in parallel in a second direction; first subpixel electrodes formed within the pixel regions on a different layer from the first electrodes and overlap the first electrodes; a second subpixel electrode formed on the same layer as the first electrodes and overlaps the second electrodes; first routing wires that group the first electrodes into m units; second routing wires that group the second electrodes into n units; first electrostatic discharging circuits that connect the first routing wires to a ground wire; and second electrostatic discharging circuits that connects the second routing wires to the ground wire, wherein the first subpixel electrodes and the second subpixel electrode constitute a unit pixel.

4 Claims, 5 Drawing Sheets

TOUCH SENSOR INTEGRATED TYPE DISPLAY DEVICE

This application claims the benefit of priority under 35 U.S.C. §119(a) to Korean Patent Application No. 10-2012-0147752 filed on Dec. 17, 2012, the entire content of which is incorporated herein by reference herein in its entirety.

BACKGROUND

1. Field

This document relates to a touch sensor integrated type display device capable of recognizing a user's touch, and more particularly, to a touch sensor integrated type display device which is capable of increasing the sensitivity of a touch sensor by reducing the amount of change in electrostatic capacitance caused by a touch driving electrode.

2. Related Art

Various input devices, such as a keyboard, a mouse, a trackball, a joystick, a digitizer, and the like, are used to configure an interface between a user and home appliances or various information communication devices. However, the use of the above input devices requires the user to learn how to use them and involves inconvenience like the space occupied by them. Accordingly, there is a growing demand for input devices which are easy and simple to use and can reduce malfunctions. In response to this demand, a touch sensor was proposed to enable the user to directly touch the screen with their finger or a pen to input information.

The touch sensor is simple to use, has less malfunctions, and enables the user to input without using an additional input device. In addition, the touch sensor can be applied to various display devices because it enables the user to operate it quickly and easily through content displayed on the screen.

Touch sensors can be classified into add-on type and on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

However, the add-on type sensor has a structure in which the completed touch panel is mounted on the display device and has various problems, such as increased thickness or reduced visibility due to low brightness of the display device In addition, the on-cell type touch sensor has a structure in which a touch panel is formed on the upper surface of the display device and can have a reduced thickness compared to the add-on type but still has the problem of the increase in entire thickness due to a driving electrode layer, a sensing electrode layer, and an insulation layer for insulating the driving electrode layer and the sensing electrode layer which constitute the touch sensor.

Accordingly, a touch sensor integrated type display device that enables a touch sensor' touch driving electrodes and touch sensing electrodes to also serve as common electrodes for the display device was devised in order to solve the prior art problems.

In the conventional touch sensor integrated type display device, various shapes of pixel electrodes are configured in a complex way within a touch unit pattern, which is created by dividing common electrodes to use them as touch driving electrodes and touch sensing electrodes. With this complex configuration, common electrodes and pixel electrodes used for a display driving operation and touch driving electrodes or touch sensing electrodes used for touch recognition are located adjacent, and become sensitive to static electricity coming from the outside.

SUMMARY

The present invention has been made in an effort to provide a touch sensor integrated type display device which is capable of preventing damage from static electricity by dividing common electrodes into an appropriate number of groups to serve as touch driving electrodes and touch sensing electrodes and grounding the common electrodes through an electrostatic charging circuit.

In one aspect, there is a touch sensor integrated type display device including each other to form a plurality of pixel regions; a plurality of first electrodes arranged in parallel in a first direction; a plurality of second electrodes that are formed on a different layer from the plurality of first electrodes and arranged in parallel in a second direction crossing the first direction; a plurality of first subpixel electrodes that are formed within the pixel regions on a different layer from the first electrodes and overlap the first electrodes; a second subpixel electrode that is formed on the same layer as the first electrodes and overlaps the second electrodes; a plurality of first routing wires that connect the plurality of first electrodes and group the first electrodes into m units (m is a natural number which is 2 or greater); a plurality of second routing wires that connect the plurality of second electrodes and group the second electrodes into n units (n is a natural number which is 2 or greater); a plurality of first electrostatic discharging circuits that are inserted between the first routing wires and a ground wire to discharge static electricity; and a plurality of second electrostatic discharging circuits that are inserted between the plurality of second routing wires and the ground wire to discharge static electricity, wherein the plurality of first subpixel electrodes and the second subpixel electrode constitute a unit pixel.

In another aspect, there is a touch sensor integrated type display device including a plurality of gate lines and a plurality of data lines that cross over each other to form a plurality of pixel regions; a plurality of first electrodes arranged in parallel in a first direction; a plurality of second electrodes that are formed on a different layer from the plurality of first electrodes and arranged in parallel in a second direction crossing the first direction; a plurality of first subpixel electrodes that are formed within the pixel regions on a different layer from the first electrodes and overlap the first electrodes; a plurality of second subpixel electrodes that are formed on the same layer as the first electrodes and overlap the second electrodes; a plurality of first routing wires that connect the plurality of first electrodes and group the first electrodes into m units (m is a natural number which is 2 or greater); a plurality of second routing wires that connect the plurality of second electrodes and group the second electrodes into n units (n is a natural number which is 2 or greater); a plurality of first electrostatic discharging circuits that are inserted between the first routing wires and a ground wire to discharge static electricity; and a plurality of second electrostatic discharging circuits that are inserted between the plurality of second routing wires and the ground wire to discharge static electricity, wherein the plurality of first subpixel electrodes constitute a unit pixel and the plurality of second subpixel electrodes constitute another unit pixel.

The plurality of first electrodes are common electrodes serving as touch driving electrodes, and the plurality of second electrodes are touch sensing electrodes.

The plurality of first electrodes are touch sensing electrodes, and the plurality of second electrodes are common electrodes also serving as touch driving electrodes.

According to a touch sensor integrated type display device in accordance with the present invention, it is possible to prevent damage from static electricity by dividing common electrodes into an appropriate number of groups to serve as touch driving electrodes and touch sensing electrodes and grounding the common electrodes through an electrostatic charging circuit.

BRIEF DESCRIPTION OF THE DRAWINGS

The teachings of the embodiments can be readily understood by considering the following detailed description in conjunction with the accompanying drawings.

DETAILED DESCRIPTION

Figure 1:
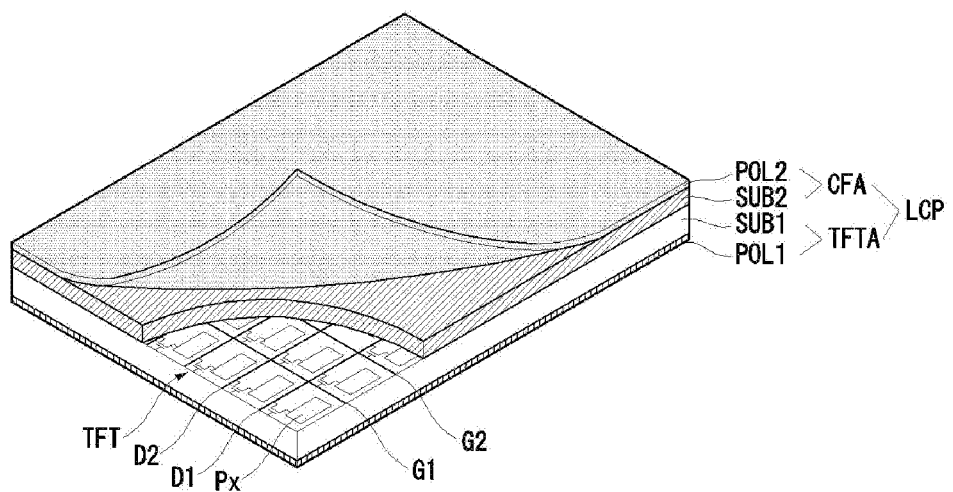
FIG. 1 is a partial exploded perspective view schematically showing a display device.

Hereinafter, exemplary embodiments of the present invention will be described in detail with reference to the attached drawings. Throughout the specification, the same reference numerals indicate substantially the same components. In the following description, a touch sensor integrated type liquid crystal display device will be described in full detail as an example of a touch sensor integrated type display device.

Figure 2:
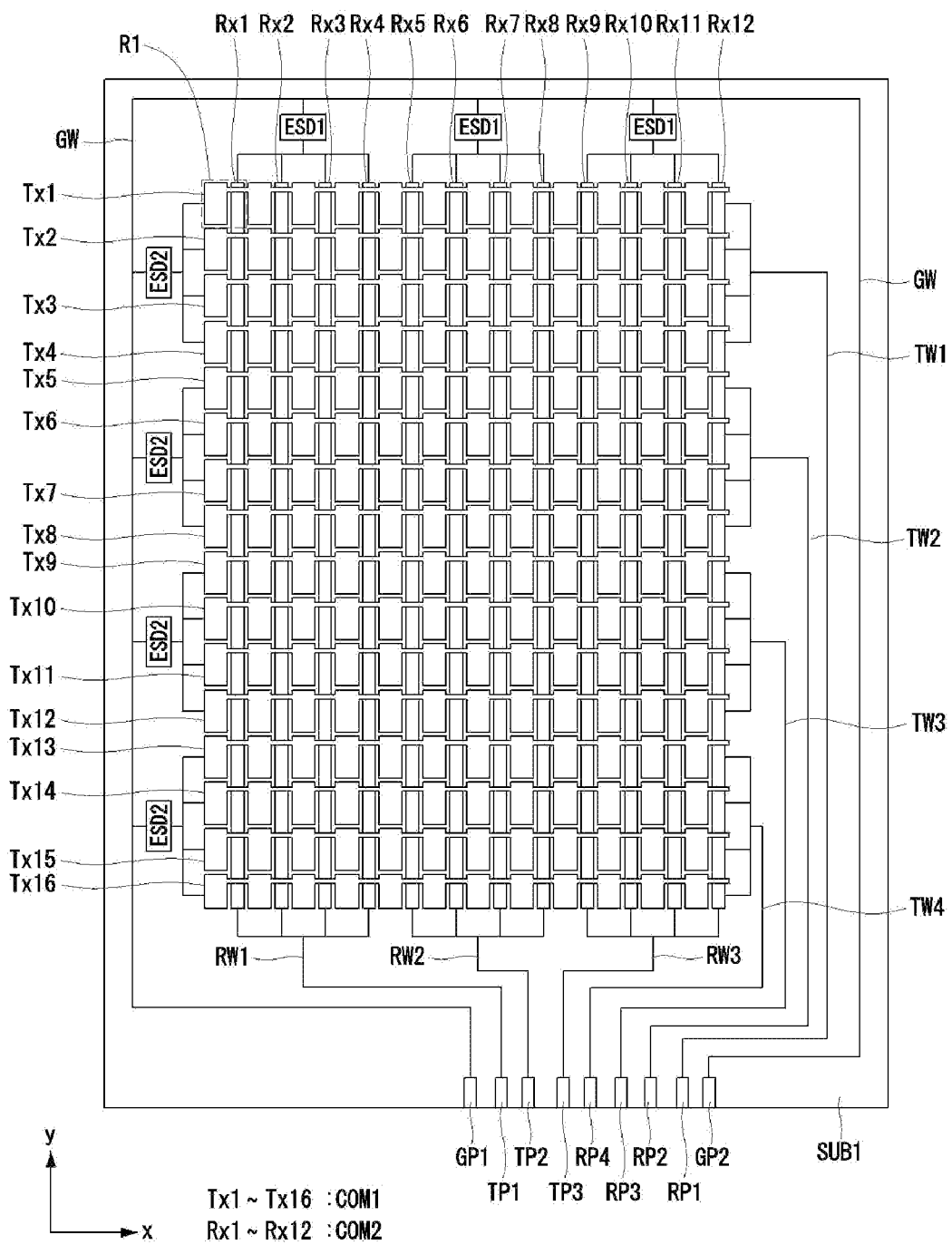
FIG. 2 is a top plan view showing a touch sensor integrated type display device according to a first exemplary embodiment of the present invention.
Figure 3:
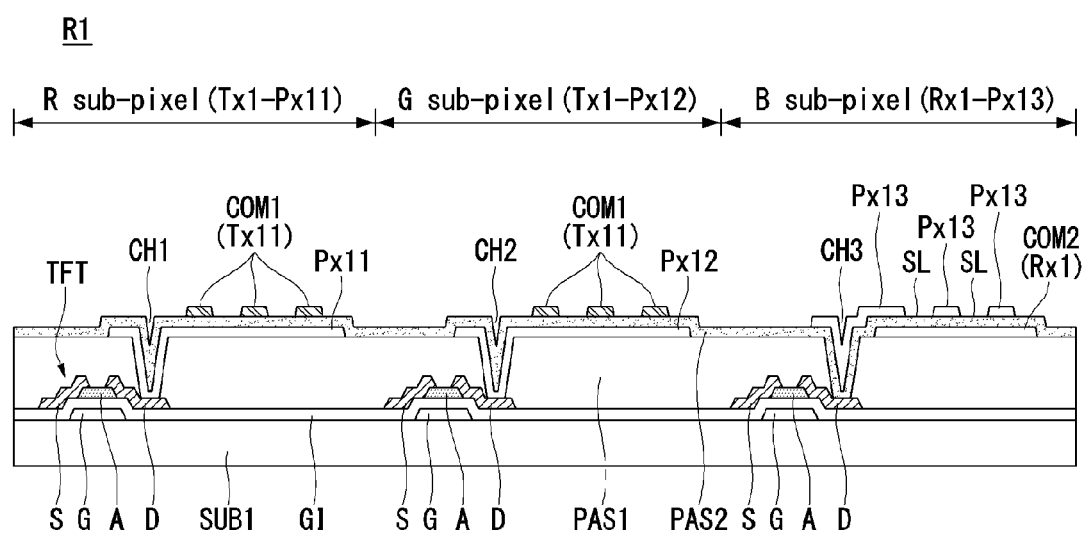
FIG. 3 is a cross-sectional view showing touch driving and touch sensing electrodes, also serving as common electrodes, and pixel electrodes in region R1 of FIG. 2.

Firstly, a touch sensor integrated type display device according to a first exemplary embodiment of the present invention will be described with reference to FIGS. 1 through 3. FIG. 1 is a partial exploded perspective view schematically showing a display device. FIG. 2 is a top plan view showing a touch sensor integrated type display device according to a first exemplary embodiment of the present invention. FIG. 3 is a cross-sectional view showing touch driving and touch sensing electrodes also serving as common electrodes and pixel electrodes in region R1 of FIG. 2.

Referring to FIG. 1, a touch sensor integrated type display device according to an exemplary embodiment of the present invention includes a thin film transistor array TFTA and a liquid crystal display panel LCP with a color filter array CFA, with a liquid crystal layer (not shown) interposed between them.

The thin film transistor array TFTA includes a plurality of gate lines G1 and G2 formed in parallel on a first substrate SUB1 in a first direction (e.g., x direction), a plurality of data lines D1 and D2 formed in parallel in a second direction (e.g., y direction) so as to cross the plurality of data lines G1 and G2, thin film transistors TFT formed at the crossings of the gate lines G1 and G2, Gm and the data lines D1 and D2, a plurality of pixel electrodes Px for charging a data voltage in liquid crystal cells, and common electrodes (not shown) disposed to face the plurality of pixel electrodes Px.

The color filter array CFA includes a black matrix BM and color filters (not shown). Polarizers POL1 and POL2 are respectively attached to the outer surfaces of the first substrate SUB1 and second substrate SUB2 of the liquid crystal display panel LCP. An alignment film (not shown) for setting a pretilt angle of liquid crystals is formed on the inner surfaces of the first and second substrates SUB1 and SUB2 contacting the liquid crystals.

The common electrodes COM are formed on the second substrate SUB2 in a vertical electric filed type driving method such as a twisted nematic (TN) mode and a vertical alignment (VA) mode. Alternatively, the common electrodes COM may be formed on the first substrate SUB1 together with the pixel electrodes Px in a horizontal electric field type driving method such as an in-plane switching (IPS) mode and a fringe field switching (FFS) mode. The exemplary embodiment of the present invention will be described below with respect to the horizontal electric field driving method.

Referring to FIGS. 2 and 3, the common electrodes according to the first exemplary embodiment of the present invention are divided into a plurality of parts to also serve as touch driving electrodes and touch sensing electrodes. Accordingly, the common electrodes will be hereinafter referred to as common electrodes, common electrodes also serving as touch driving electrodes, common electrodes also serving as touch sensing electrodes, touch driving electrodes, touch sensing electrodes, touch driving electrodes also serving as common electrodes, or touch sensing electrodes also serving as common electrodes according to a need.

As shown in FIG. 2, the common electrodes COM consist of a plurality of common electrodes divided in a first direction (x-axis direction) and a second direction (y-axis direction). Among these common electrodes, the first common electrodes COM1 divided in the x-axis direction and arranged in parallel in the y-axis direction constitute touch driving electrodes Tx1 to Tx16, and the second common electrodes COM2 divided in the y-axis direction and arranged in parallel in the x-axis direction constitute touch sensing electrodes Rx1 to Rx12.

Referring to FIGS. 2 and 3, first common electrodes COM1 are disposed to face a R-subpixel electrode Px11 and a G-subpixel electrode Px12, which are formed on a first passivation layer PAS1 covering the thin film transistors TFT, with a second passivation layer PAS2 interposed between them, and a second common electrode COM2 is disposed to face a B-subpixel electrode Px13, which is formed on the second passivation layer PAS2, with the second passivation layer PAS2 interposed between them. While the first common electrodes COM1 are formed in an R-subpixel region and a G-subpixel region on the second passivation layer PAS2, the second common electrode COM2 is formed in a B-subpixel region on the first passivation layer PAS1.

Although in the first exemplary embodiment the first common electrodes COM1 serve as the touch driving electrodes Tx1 to Tx16 and the second common electrodes COM2 serve as the touch sensing electrodes Rx1 to Rx12, the first common electrodes COM1 may serve as the touch sensing electrodes and the second common electrodes COM2 may serve as the touch driving electrodes.

Referring again to FIGS. 2 and 3, the relationship between the first and second common electrodes COM1 and COM2 and the pixel electrodes Px11 to Px13 will be described in more detail. Each thin film transistor TFT includes a gate electrode G formed on the first substrate SUB1 and extending from a gate line G1, an active layer A formed corresponding to the gate electrode G on a gate insulating layer GI covering the gate line G1 and the gate electrode G, a source electrode S that is formed on a first passivation layer PAS1 covering the active layer A and extends from a data line D1, and a drain electrode D facing the source electrode S.

The positions where the subpixel electrodes and the common electrodes are formed on the first passivation layer PAS1 vary depending on the subpixel regions. Referring to FIG. 3, the R-subpixel electrode Px11 is formed on the first passivation layer PAS1 in the R-subpixel region and the G-subpixel electrode Px12 is formed on the first passivation layer PAS1 in the G-subpixel region, whereas a second common electrode COM2 also serving as the touch sensing electrode Rx1 is formed on the first passivation layer PAS1 in the B-subpixel region.

On the second passivation layer PAS2 covering the R-subpixel electrode Px11, the G-subpixel electrode Px12, and the second common electrode COM2, a first common electrode COM1 also serving as the touch driving electrode Tx1 is formed in the R-subpixel region so as to overlap the R-subpixel electrode Px11, a first common electrode COM1 also serving as the touch driving electrode Tx1 is formed in the G-subpixel region so as to overlap the G-subpixel electrode Px12, and the B-subpixel electrode Px13 is formed in the B-subpixel region.

In the R-subpixel region corresponding to a first common electrode COM1, the R-subpixel electrode Px11 is connected to the drain electrode D of the thin film transistor TFT via a first contact hole CH1 penetrating the first passivation layer PAS1. In the G-subpixel region corresponding to a first common electrode COM1, the G-subpixel electrode Px12 is connected to the drain electrode D of the thin film transistor TFT via a second contact hole CH2 penetrating the first passivation layer PAS1. In the B-subpixel region corresponding to a second common electrode COM2, the B-subpixel electrode Px13 is connected to the drain electrode D of the thin film transistor TFT via a third contact hole CH3 penetrating the first and second passivation layers PAS1 and PAS2.

In the first exemplary embodiment of the present invention, the R-subpixel electrode Px11, the G-subpixel electrode Px12, and the second common electrode COM2, which are formed on the first passivation layer PAS1, have no slits, and the first common electrodes COM1 and the B-subpixel electrode Px13, which are formed on the second passivation layer PAS2, have slits.

As can be seen from FIG. 3, the common electrodes according to the first exemplary embodiment of the present invention comprise a plurality of first common electrodes COM1 and a plurality of second common electrodes COM2, which are formed on different layers. The R and G subpixel electrodes Px11 and Px12 and the B-subpixel electrode Px13, which constitute a unit pixel electrode, are also formed on different layers.

The touch sensing electrodes Rx1 to Rx12 according to the first exemplary embodiment of the present invention are grouped into four units by connecting wires, and then connected to sensing routing pads RP1 to RP4 via sensing routing wires RW1 to RW3. Specifically, the first to fourth touch sensing electrodes Rx1 to Rx4 are connected to the first sensing routing pad RP1 via the first sensing routing wire RW1, the fifth to eighth touch sensing electrodes Rx5 to Rx8 are connected to the second sensing routing pad RP1 via the second sensing routing wire RW2, and the ninth to twelfth touch sensing electrodes Rx9 to Rx12 are connected to the third sensing routing pad RP3 via the third sensing routing wire RW3. Although the first exemplary embodiment of the present invention has been described with respect to an example where the touch sensing electrodes are grouped into four units, the present invention is not limited to this example and the touch sensing electrodes may be grouped into any other number of (e.g., several or several tens of) units.

The grouped touch sensing electrodes Rx1 to Rx4, Rx5 to Rx8, and Rx9 to Rx12 are connected to a ground line GW through a first electrostatic discharging circuit ESD1. The touch sensing electrodes Rx1 to Rx4, Rx5 to Rx8, and Rx9 to Rx12 also serve as common electrodes, and the first electrostatic discharging circuit ESD1 is configured such that it is turned off when a common voltage is applied and turned on and connected to the ground line only when a very high voltage such as static electricity is applied. Thus, the internal circuit can be protected from static electricity. A general configuration of the first electrostatic discharging circuit ESD1 is well known, so a detailed description thereof will be omitted.

The touch driving electrodes Tx1 to Tx16 according to the first exemplary embodiment of the present invention are grouped into four units by connecting wires, and then connected to first to fourth driving routing pads TP1 to TP4 via first to fourth driving routing wires TW1 to TW4. Specifically, the first to fourth touch driving electrodes Tx1 to Tx4 are connected to the first driving routing pad TP1 via the first driving routing wire TW1, the fifth to eighth touch driving electrodes Tx5 to Tx8 are connected to the second driving routing pad TP1 via the second driving routing wire TW2, and the ninth to twelfth touch driving electrodes Tx9 to Tx12 are connected to the third driving routing pad TP3 via the third driving routing wire TW3. Although the first exemplary embodiment of the present invention has been described with respect to an example where the touch driving electrodes are grouped into four units, the present invention is not limited to this example and the touch driving electrodes may be grouped into any other number of (e.g., several or several tens of) units.

The grouped touch driving electrodes Tx1 to Tx4, Tx5 to Tx8, and Tx9 to Tx12 are connected to the ground line GW through a second electrostatic discharging circuit ESD2. The touch driving electrodes Tx1 to Tx4, Tx5 to Tx8, and Tx9 to Tx12 also serve as common electrodes, and the second electrostatic discharging circuit ESD2 is configured such that it is turned off when a common voltage is applied and turned on and connected to the ground line only when a very high voltage such as static electricity is applied. Thus, the internal circuit can be protected from static electricity. The second electrostatic discharging circuit ESD2 has the same configuration as the first electrostatic discharging circuit ESD1 and is a well-known element, so a detailed description thereof will be omitted.

Although the above-described touch sensor integrated type display device according to the first exemplary embodiment of the present invention has been described in a way that the first common electrodes COM1 formed in the R-subpixel region and the G-subpixel region are the touch driving electrodes Tx1 to Tx16 and the second common electrodes COM2 formed in the B-subpixel region are the touch sensing electrode Rx1 to Rx12, the present invention is not limited thereto. For example, the first common electrodes COM1 formed in the R-subpixel region and the G-subpixel region may be the touch sensing electrode Rx1 to Rx12, and the second common electrodes COM2 formed in the B-subpixel region may be the touch driving electrodes Tx1 to Tx16.

Moreover, although the above-described touch sensor integrated type display device according to the first exemplary embodiment of the present invention has been described in a way that the first common electrodes COM1 formed in the R-subpixel region and the G-subpixel region are formed on the second passivation layer PAS2, the R- and G-subpixel electrodes Px11 and Px12 are formed on the first passivation layer PAS1, the second common electrode COM2 formed in the B-subpixel region is formed on the first passivation layer PAS1, and the B-subpixel electrode Px13 is formed on the second passivation layer PAS2, the present invention is not limited thereto. For example, the first common electrodes formed in the R-subpixel region and the G-subpixel region may be formed on the first passivation layer PAS1, the R- and G-subpixel electrodes Px11 and Px12 may be formed on the second passivation layer PAS2, the second common electrode COM2 formed in the B-subpixel region may be formed on the second passivation layer PAS2, and the B-subpixel electrode Px13 may be formed on the first passivation layer PAS1.

Further, in the above-described touch sensor integrated type display device according to the first exemplary embodiment of the present invention, if the touch sensing electrodes and the touch driving electrodes are made of a high-resistivity transparent conductive material such as ITO (indium tin oxide), IZO (indium zinc oxide), or GZO (gallium-doped zinc oxide), at least one resistance-reducing wire selected from the group consisting of metals such as Al, AlNd, MO, MoTi, Cu, Cr, Ag, and alloys thereof may be formed in both the touch sensing electrodes and the touch driving electrodes, in order to reduce the resistance of the touch sensing electrodes and touch driving electrodes. In this case, the touch driving electrodes may be connected to the driving routing wires via a driving electrode resistance-reducing wire, and the touch sensing electrodes may be connected to the sensing routing wires via a sensing electrode resistance-reducing wire.

Figure 4:
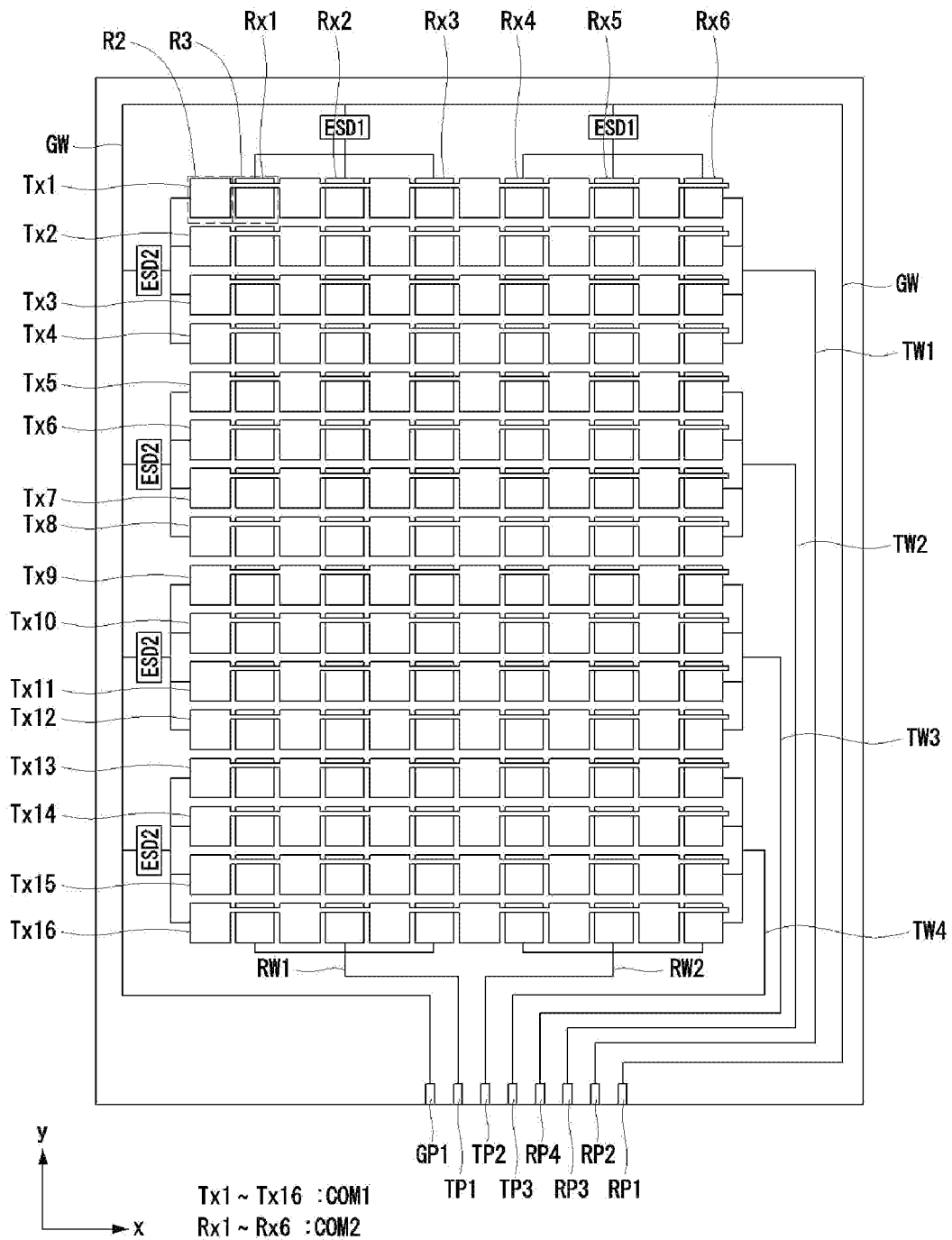
FIG. 4 is a top plan view showing a touch sensor integrated type display device according to a second exemplary embodiment of the present invention.
Figure 5:
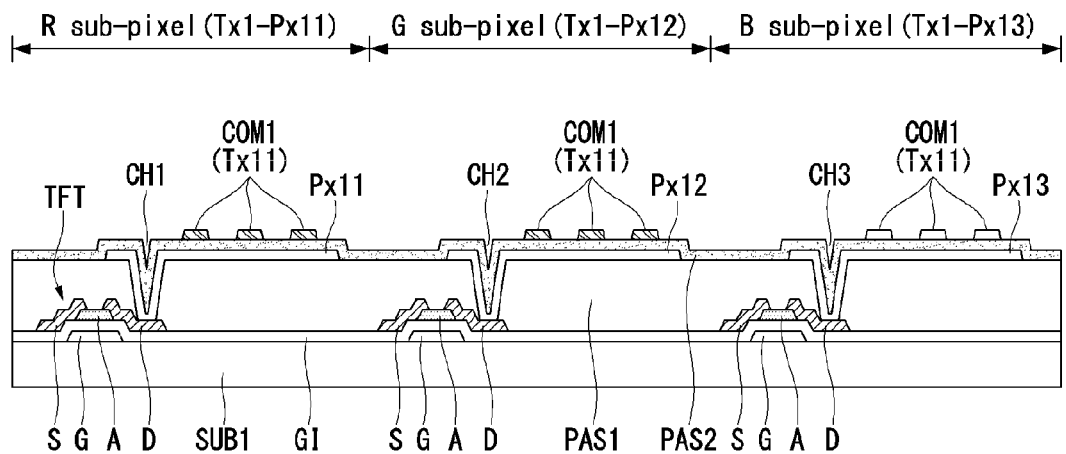
FIG. 5 is a cross-sectional view showing touch driving and touch sensing electrodes, also serving as common electrodes, and pixel electrodes in each of regions R2 and R3 of FIG. 4.
Figure 5:
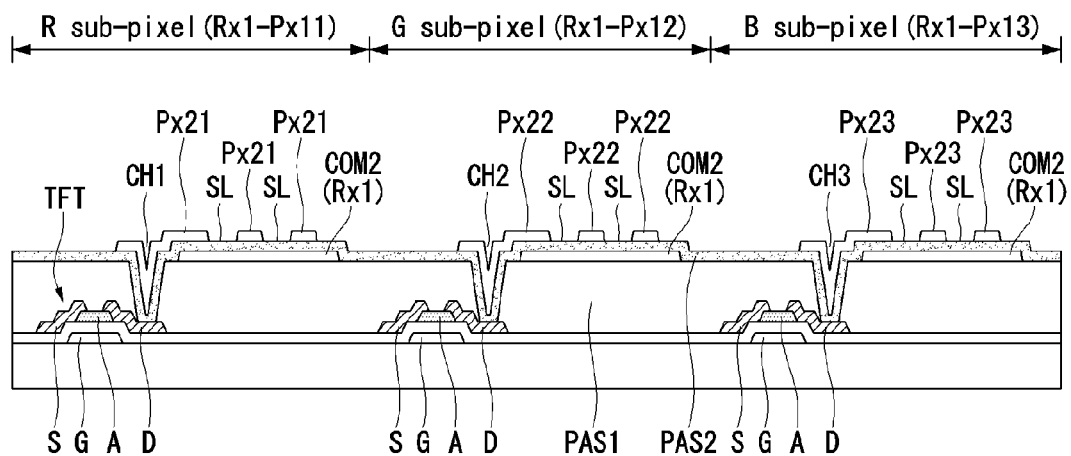

Next, a touch sensor integrated type display device according to a second exemplary embodiment of the present invention will be described with reference to FIGS. 4 and 5. FIG. 4 is a top plan view schematically showing the overall configuration of touch driving and touch sensing electrodes also serving as common electrodes in a touch sensor integrated type display device according to a second exemplary embodiment of the present invention. FIG. 5 is a top plan view showing touch driving and touch sensing electrodes, also serving as common electrodes, and pixel electrodes in each of regions R2 and R3 of FIG. 4.

Referring to FIGS. 4 and 5, the common electrodes according to the second exemplary embodiment of the present invention are divided into a plurality of parts to also serve as touch driving electrodes and touch sensing electrodes. Accordingly, the common electrodes will be hereinafter referred to as common electrodes, common electrodes also serving as touch driving electrodes, common electrodes also serving as touch sensing electrodes, touch driving electrodes, touch sensing electrodes, touch driving electrodes also serving as common electrodes, or touch sensing electrodes also serving as common electrodes.

As shown in FIG. 4, the common electrodes COM consist of a plurality of common electrodes divided in a first direction (x-axis direction) and a second direction (y-axis direction). Among these common electrodes, the first common electrodes COM1 divided in the x-axis direction and arranged in parallel in the y-axis direction constitute touch driving electrodes Tx1 to Tx16, and the second common electrodes COM2 divided in the y-axis direction and arranged in parallel in the x-axis direction constitute touch sensing electrodes Rx1 to Rx12.

Referring to FIGS. 4 and 5, first common electrodes COM1 are disposed to face a R-subpixel electrode Px11, a G-subpixel electrode Px12, and a B-subpixel electrode Px13, which are formed on a first passivation layer PAS1 covering the thin film transistors TFT, with a second passivation layer PAS2 interposed between them. And second common electrodes COM2 are disposed to face an R-subpixel electrode Px21, a G-subpixel electrode Px22, and a B-subpixel electrode Px23, which are formed on the second passivation layer PAS2, with the second passivation layer PAS2 interposed between them. While the first common electrodes COM1 are formed in an R-subpixel region, a G-subpixel region, and a B-subpixel region on the second passivation layer PAS2, the second common electrodes COM2 are formed in an R-subpixel region, a G-subpixel region, and a B-subpixel region on the first passivation layer PAS1.

Although in the second exemplary embodiment the first common electrodes COM1 serve as the touch driving electrodes Tx1 to Tx16 and the second common electrodes COM2 serve as the touch sensing electrodes Rx1 to Rx12, the first common electrodes COM1 may serve as the touch sensing electrodes and the second common electrodes COM2 may serve as the touch driving electrodes.

Referring again to FIGS. 4 and 5, the relationship between the first and second common electrodes COM1 and COM2 and the pixel electrodes Px will be described in more detail. Each thin film transistor TFT includes a gate electrode G formed on the first substrate SUB1 and extending from a gate line G1, an active layer A formed corresponding to the gate electrode G on a gate insulating layer GI covering the gate line G1 and the gate electrode G, a source electrode S that is formed on a first passivation layer PAS1 covering the active layer A and extends from a data line D1, and a drain electrode D facing the source electrode S.

The positions where the subpixel electrodes and the first and second common electrodes are formed vary depending on the subpixel regions corresponding to the first common electrodes COM1 and the second common electrodes COM2. Referring to FIG. 5, the R-subpixel electrode Px11 is formed on the first passivation layer PAS1 in the R-subpixel region corresponding to a first common electrode COM1 also serving as a touch sensing electrode, the G-subpixel electrode Px12 is formed on the first passivation layer PAS1 in the G-subpixel region corresponding to a first common electrode COM1 also serving as the touch sensing electrode, and the B-subpixel electrode Px13 is formed on the first passivation layer PAS1 in the B-subpixel region corresponding to a first common electrode COM1 also serving as the touch sensing electrode.

Also, the R-subpixel electrode Px21 is formed on the second passivation layer PAS2 in the R-subpixel region corresponding to a second common electrode COM2 also serving as a touch driving electrode, the G-subpixel electrode Px22 is formed on the second passivation layer PAS2 in the G-subpixel region corresponding to a second common electrode COM2 also serving as the touch driving electrode, and the B-subpixel electrode Px23 is formed on the second passivation layer PAS2 in the B-subpixel region corresponding to a second common electrode COM2 also serving as the touch driving electrode.

Accordingly, first common electrodes COM1 also serving as touch driving electrodes are formed on the second passivation layer PAS2 corresponding to the R-subpixel electrode Px11, G-subpixel electrode Px12, and B-subpixel electrode Px13 formed on the first passivation layer PAS1, so as to overlap the R-subpixel electrode Px11, G-subpixel electrode Px12, and B-subpixel electrode Px13. Also, second common electrodes COM2 also serving as touch driving electrodes are formed on the first passivation layer PAS1 corresponding to the R-subpixel electrode Px21, G-subpixel electrode Px22, and B-subpixel electrode Px23 formed on the second passivation layer PAS2, so as to overlap the R-subpixel electrode Px21, G-subpixel electrode Px22, and B-subpixel electrode Px23.

In the R-subpixel region corresponding to a first common electrode COM1, the R-subpixel electrode Px11 is connected to the drain electrode D of the thin film transistor TFT via a first contact hole CH1 penetrating the first passivation layer PAS1. In the G-subpixel region corresponding to a first common electrode COM1, the G-subpixel electrode Px12 is connected to the drain electrode of the thin film transistor TFT via a second contact hole CH2 penetrating the first passivation layer PAS1. In the B-subpixel region corresponding to a first common electrode COM1, the B-subpixel electrode Px13 is connected to the drain electrode D of the thin film transistor TFT via a third contact hole CH3 penetrating the first passivation layer PAS1.

Also, in the R-subpixel region corresponding to a second common electrode COM2, the R-subpixel electrode Px21 is connected to the drain electrode D of the thin film transistor TFT via a fourth contact hole CH4 penetrating the first and second passivation layers PAS1 and PAS2. In the G-subpixel region corresponding to a second common electrode COM2, the G-subpixel electrode Px22 is connected to the drain electrode D of the thin film transistor TFT via a fifth contact hole CH5 penetrating the first and second passivation layers PAS1 and PAS2. In the B-subpixel region corresponding to a second common electrode COM2, the B-subpixel electrode Px23 is connected to the drain electrode D of the thin film transistor TFT via a sixth contact hole CH6 penetrating the first and second passivation layers PAS1 and PAS2.

In the second exemplary embodiment of the present invention, the R-subpixel electrode Px11, the G-subpixel electrode Px12, and the B-subpixel electrode Px13, which are formed on the first passivation layer PAS1, have no slits, and the first common electrodes COM1, which are formed on the second passivation layer PAS2, have slits. Also, the second common electrodes COM2, which are formed on the first passivation layer PAS1, have no slits, and the R-subpixel electrode Px21, the G-subpixel electrode Px22, and the B-subpixel electrode Px23, which are formed on the second passivation layer PAS2, have slits.

As can be seen from FIG. 4, the common electrodes according to the second exemplary embodiment of the present invention comprise a plurality of first common electrodes COM1 and a plurality of second common electrodes COM2, which are formed on different layers. The R-, G-, and B-subpixel electrodes Px11 to Px13, which constitute a unit pixel electrode, and the R-, G-, and B-subpixel electrode Px21 to Px23, which constitute a neighboring unit pixel electrode, may be formed on different layers.

The touch sensing electrodes Rx1 to Rx12 according to the second exemplary embodiment of the present invention are grouped into four units by connecting wires, and then connected to sensing routing pads RP1 to RP4 via sensing routing wires RW1 to RW3. Specifically, the first to fourth touch sensing electrodes Rx1 to Rx4 are connected to the first sensing routing pad RP1 via the first sensing routing wire RW1, the fifth to eighth touch sensing electrodes Rx5 to Rx8 are connected to the second sensing routing pad RP1 via the second sensing routing wire RW2, and the ninth to twelfth touch sensing electrodes Rx9 to Rx12 are connected to the third sensing routing pad RP3 via the third sensing routing wire RW3. Although the second exemplary embodiment of the present invention has been described with respect to an example where the touch sensing electrodes are grouped into four units, the present invention is not limited to this example and the touch sensing electrodes may be grouped into any other number of (e.g., several or several tens of) units.

The grouped touch sensing electrodes Rx1 to Rx4, Rx5 to Rx8, and Rx9 to Rx12 are connected to a ground line GW through a first electrostatic discharging circuit ESD1. The touch sensing electrodes Rx1 to Rx4, Rx5 to Rx8, and Rx9 to Rx12 also serve as common electrodes, and the first electrostatic discharging circuit ESD1 is configured such that it is turned off when a common voltage is applied and turned on and connected to the ground line only when a very high voltage such as static electricity is applied. Thus, the internal circuit can be protected from static electricity. A general configuration of the first electrostatic discharging circuit ESD1 is well known, so a detailed description thereof will be omitted.

The touch driving electrodes Tx1 to Tx16 according to the second exemplary embodiment of the present invention are grouped into four units by connecting wires, and then connected to first to fourth driving routing pads TP1 to TP4 via first to fourth driving routing wires TW1 to TW4. Specifically, the first to fourth touch driving electrodes Tx1 to Tx4 are connected to the first driving routing pad TP1 via the first driving routing wire TW1, the fifth to eighth touch driving electrodes Tx5 to Tx8 are connected to the second driving routing pad TP1 via the second driving routing wire TW2, and the ninth to twelfth touch driving electrodes Tx9 to Tx12 are connected to the third driving routing pad TP3 via the third driving routing wire TW3. Although the second exemplary embodiment of the present invention has been described with respect to an example where the touch driving electrodes are grouped into four units, the present invention is not limited to this example and the touch driving electrodes may be grouped into any other number of (e.g., several or several tens of) units.

The grouped touch driving electrodes Tx1 to Tx4, Tx5 to Tx8, and Tx9 to Tx12 are connected to the ground line GW through a second electrostatic discharging circuit ESD2. The touch driving electrodes Tx1 to Tx4, Tx5 to Tx8, and Tx9 to Tx12 also serve as common electrodes, and the second electrostatic discharging circuit ESD2 is configured such that it is turned off when a common voltage is applied and turned on and connected to the ground line only when a very high voltage such as static electricity is applied. Thus, the internal circuit can be protected from static electricity. The second electrostatic discharging circuit ESD2 has the same configuration as the first electrostatic discharging circuit ESD1 and is a well-known element, so a detailed description thereof will be omitted.

Although the above-described touch sensor integrated type display device according to the second exemplary embodiment of the present invention has been described in a way that the first common electrodes COM1 corresponding to the R-subpixel electrode Px11, G-subpixel electrode Px12, and B-subpixel electrode Px13 also serve as the touch driving electrodes Tx1 to Tx16, and the second common electrodes COM2 corresponding to the R-subpixel electrode Px21, G-subpixel electrode Px22, and B-subpixel electrode Px23 also serve as the touch sensing electrodes Rx1 to Rx6, the present invention is not limited thereto. For example, the first common electrodes COM1 may be the touch sensing electrodes Rx1 to Rx6, and the second common electrodes COM2 may be the touch driving electrodes Tx1 to Tx16.

Moreover, although the above-described touch sensor integrated type display device according to the second exemplary embodiment of the present invention has been described in a way that the R-, G-, and B-subpixel electrodes Px11, Px12, and Px13 are formed on the first passivation layer PAS1, the first common electrodes COM1 are formed on the second passivation layer PAS2, the R-, G-, and B-subpixel electrodes Px21, Px22, and Px23 are formed on the second passivation layer PAS2, and the second common electrodes COM2 are formed on the first passivation layer PAS1, the present invention is not limited thereto. For example, the R-, G-, and B-subpixel electrodes Px11, Px12, and Px13 may be formed on the second passivation layer PAS2, the first common electrodes COM1 may be formed on the first passivation layer PAS1, the R-, G-, and B-subpixel electrodes Px21, Px22, and Px23 may be formed on the first passivation layer PAS1, and the second common electrodes COM2 are formed on the first passivation layer PAS1

Further, in the above-described touch sensor integrated type display device according to the second exemplary embodiment of the present invention, if the touch sensing electrodes and the touch driving electrodes are made of a high-resistivity transparent conductive material such as ITO (indium tin oxide), IZO (indium zinc oxide), or GZO (gallium-doped zinc oxide), at least one resistance-reducing wire selected from the group consisting of metals such as Al, AlNd, MO, MoTi, Cu, Cr, Ag, and alloys thereof may be formed in both the touch sensing electrodes and the touch driving electrodes, in order to reduce the resistance of the touch sensing electrodes and touch driving electrodes. In this case, the touch driving electrodes may be connected to the driving routing wires via a driving electrode resistance-reducing wire, and the touch sensing electrodes may be connected to the sensing routing wires via a sensing electrode resistance-reducing wire.

According to the above-described exemplary embodiments of the present invention, it is possible to prevent damage from static electricity by dividing common electrodes into an appropriate number of groups to serve as touch driving electrodes and touch sensing electrodes and grounding the common electrodes through an electrostatic charging circuit.

Although particular embodiments of the present invention have been illustrated and described, it will be apparent to those skilled in the art that various changes and modifications can be made without departing from the spirit of the present invention. For example, while the exemplary embodiments of the present invention have been described with respect to an example in which a unit pixel consists of R (red), G (green), and B (blue) subpixel electrodes, the present invention is not limited to these exemplary embodiments and the unit pixel may consist of more subpixel electrodes. Accordingly, the technical scope of the present invention is not limited to the detailed description of the present invention, but should be defined by the appended claims.

What is claimed is:

1. A touch sensor integrated type display device comprising:
   a plurality of gate lines and a plurality of data lines that cross over each other to form a plurality of pixel regions;
   a plurality of first electrodes arranged in parallel in a first direction;
   a plurality of second electrodes that are formed on a different layer from the plurality of first electrodes and arranged in parallel in a second direction crossing the first direction,
   wherein the plurality of first electrodes and the plurality of second electrodes are common electrodes, one of the pluralities of first electrodes and second electrodes serving as touch driving electrodes, and the other of the pluralities of first electrodes and second electrodes serving as touch sensing electrodes;
   a plurality of unity pixels, wherein each of the plurality of unit pixels includes:
      a plurality of first subpixel electrodes that are formed within the pixel regions on a different layer from the first electrodes and on the same layer as the second electrodes, and overlap the first electrodes in a cross-sectional view of the display device; and
      a second subpixel electrode that is formed on the same layer as the first electrodes and on a different layer from the second electrodes, and overlaps the second electrodes in a cross-sectional view of the display device;
   a plurality of first routing wires that connect the plurality of first electrodes and group the first electrodes into m units (m is a natural number which is 2 or greater);
   a plurality of second routing wires that connect the plurality of second electrodes and group the second electrodes into n units (n is a natural number which is 2 or greater);
   a plurality of first electrostatic discharging circuits that are inserted between the first routing wires and a ground wire to discharge static electricity; and
   a plurality of second electrostatic discharging circuits that are inserted between the plurality of second routing wires and the ground wire to discharge static electricity,
   wherein the plurality of first subpixel electrodes and the second subpixel electrode included in a unit pixel are different from the first and second electrodes and are each for a different color.

2. The touch sensor integrated type display device of claim 1, wherein the plurality of first electrodes are common electrodes serving as touch driving electrodes, and the plurality of second electrodes are common electrodes serving as touch sensing electrodes.

3. The touch sensor integrated type display device of claim 1, wherein the plurality of first electrodes are common electrodes serving as touch sensing electrodes, and the plurality of second electrodes are common electrodes serving as touch driving electrodes.

4. The touch sensor integrated type display device of claim 1, wherein the ground wire surrounds an area where the first and second electrodes and the first and second routing wires are disposed, wherein the ground wire does not overlap the first and second electrodes and the first and second routing wires in plan view.

* * * * *